Oct. 7, 1930.  W. BAGGE  1,777,686
AXLE BENDING APPARATUS
Filed Nov. 22, 1926   4 Sheets-Sheet 2

INVENTOR
WALTER BAGGE
BY Munn & Co.
ATTORNEY

Oct. 7, 1930.  W. BAGGE  1,777,686
AXLE BENDING APPARATUS
Filed Nov. 22, 1926  4 Sheets-Sheet 3
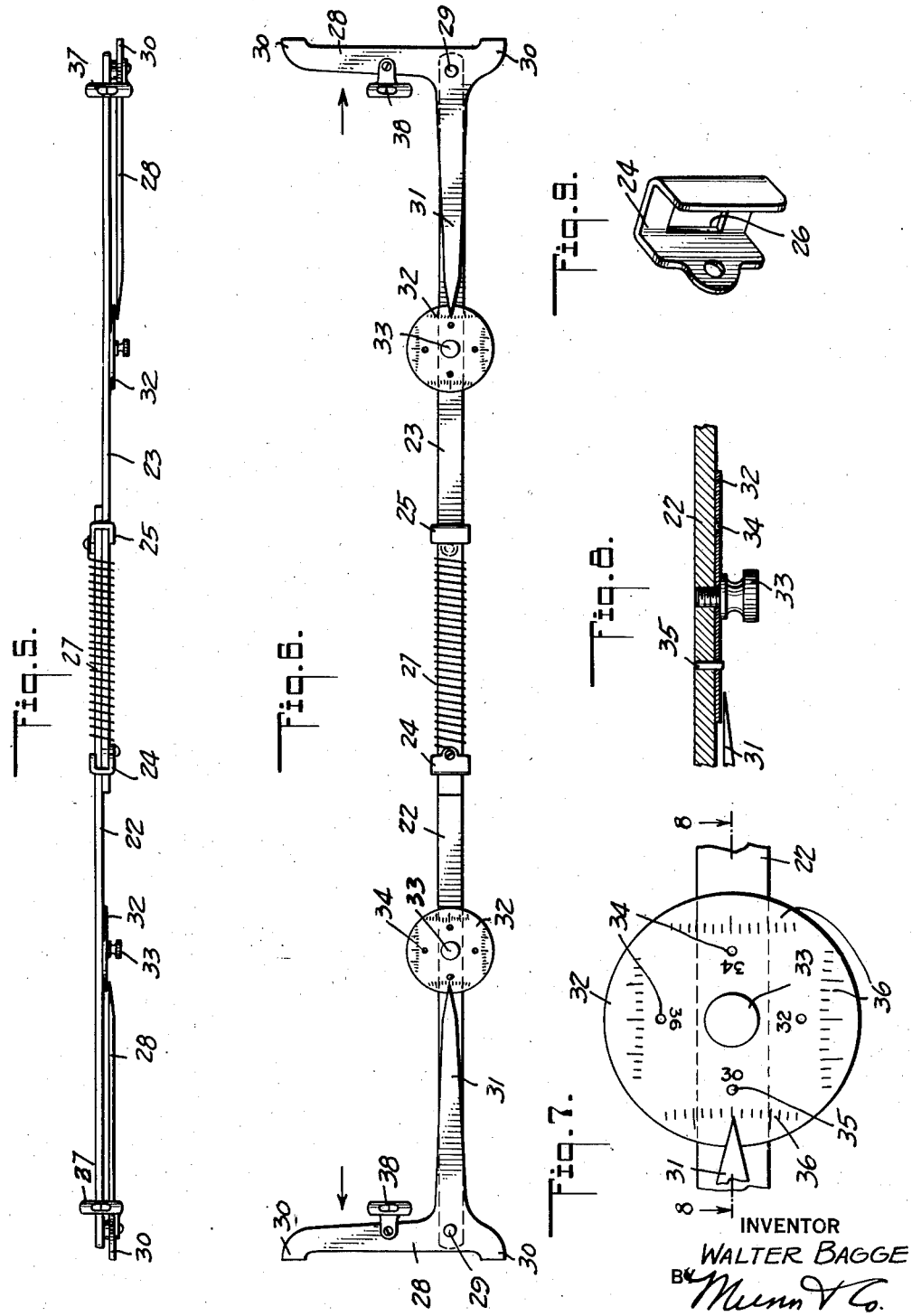
INVENTOR
WALTER BAGGE
BY Munn & Co.
ATTORNEY Oct. 7, 1930.                    W. BAGGE                    1,777,686
                           AXLE BENDING APPARATUS
                     Filed Nov. 22, 1926          4 Sheets-Sheet 4
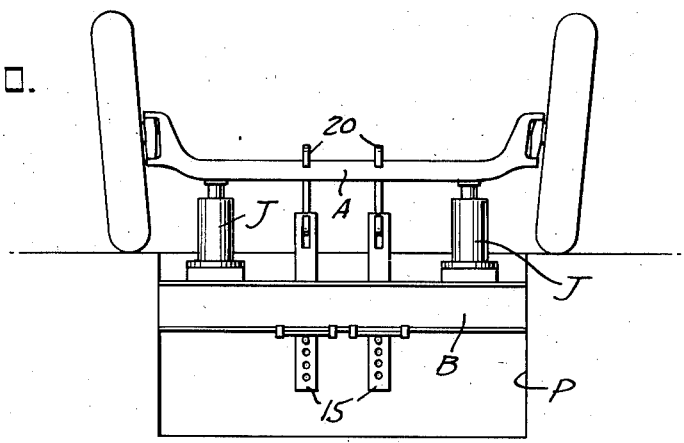
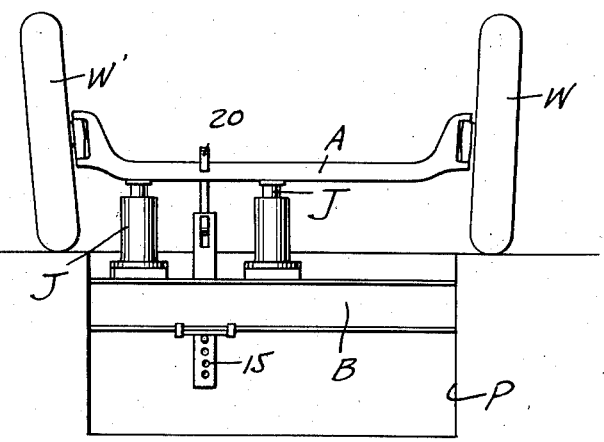
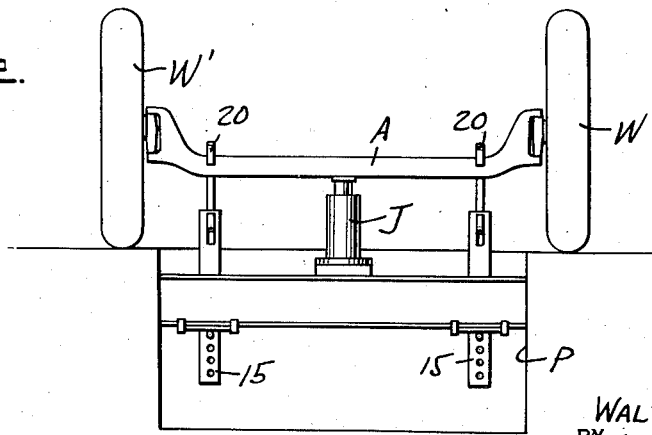
INVENTOR
WALTER BAGGE
BY Munn & Co.
ATTORNEY Patented Oct. 7, 1930

1,777,686

UNITED STATES PATENT OFFICE

WALTER BAGGE, OF LOS ANGELES, CALIFORNIA, ASSIGNOR OF ONE-THIRD TO ERNEST BAGGE AND ONE-THIRD TO ARTHUR B. IMHOFF, BOTH OF LOS ANGELES, CALIFORNIA

AXLE-BENDING APPARATUS

Application filed November 22, 1926. Serial No. 150,112.

My invention relates to metal bending apparatus, and has particular reference, although not necessarily, to apparatus for bending the axles of motor vehicles.

It is a purpose of my invention to provide an apparatus by which the bending of vehicle axles can be effected with facility, dispatch and accuracy to vary the camber of the front wheels of any vehicle as desired, and irrespective of the dimensions of the axle, thus rendering the apparatus adaptable to all vehicles, including large motor trucks.

I will described only one form of axle bending apparatus embodying my invention, and will then point out the novel features thereof in claims.

In the drawings

Figure 1:
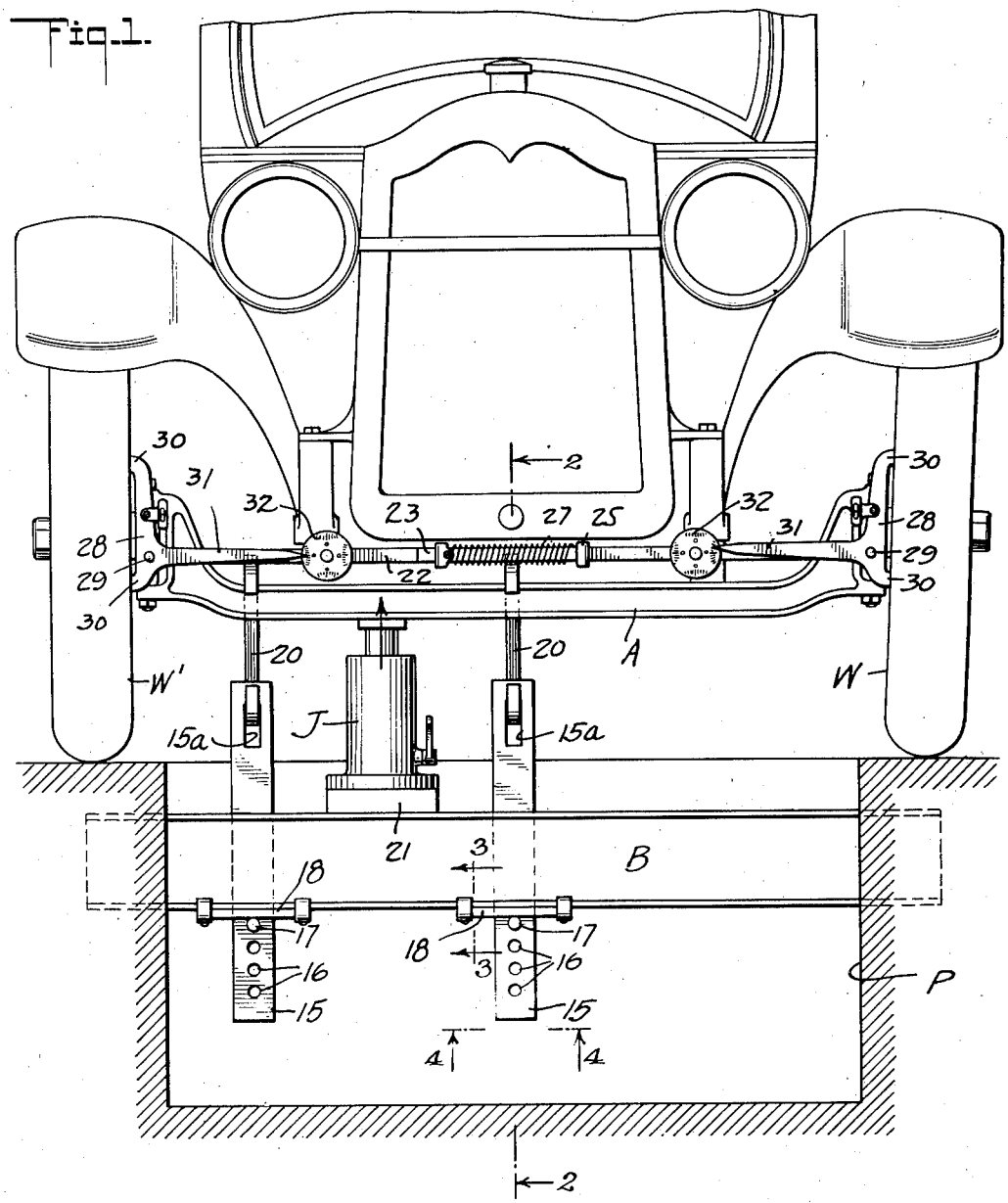
Figure 1 is a view showing in front elevation one form of axle bending apparatus embodying my invention in applied position to the front axle of a motor vehicle.
Figure 3:
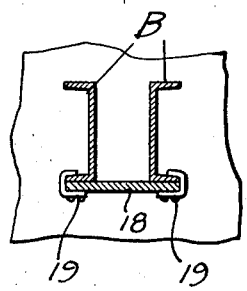
Figure 4:
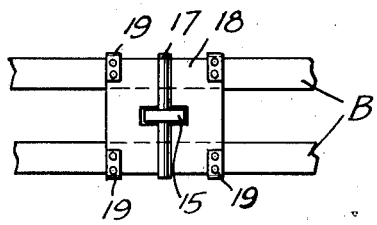

Figures 3 and 4 are views taken on the line 3—3 and 4—4, respectively, of Figure 1;

Figure 5 is a view showing in top plan the gage embodied in the apparatus shown in Figure 1;

Figure 6 is a view showing the gage in side elevation;

Figure 7 is an enlarged fragmentary view showing one of the graduated disks embodied in the gage shown in Figure 5;

Figure 8 is a sectional view taken on the line 8—8 of Figure 7;

Figure 9 is a detail perspective view of one of the brackets embodied in the gage shown in Figure 6;

Figures 10, 11 and 12 are views showing different adaptations of the apparatus to vehicle axles.

Similar reference characters refer to similar parts in each of the several views.

Figure 2:
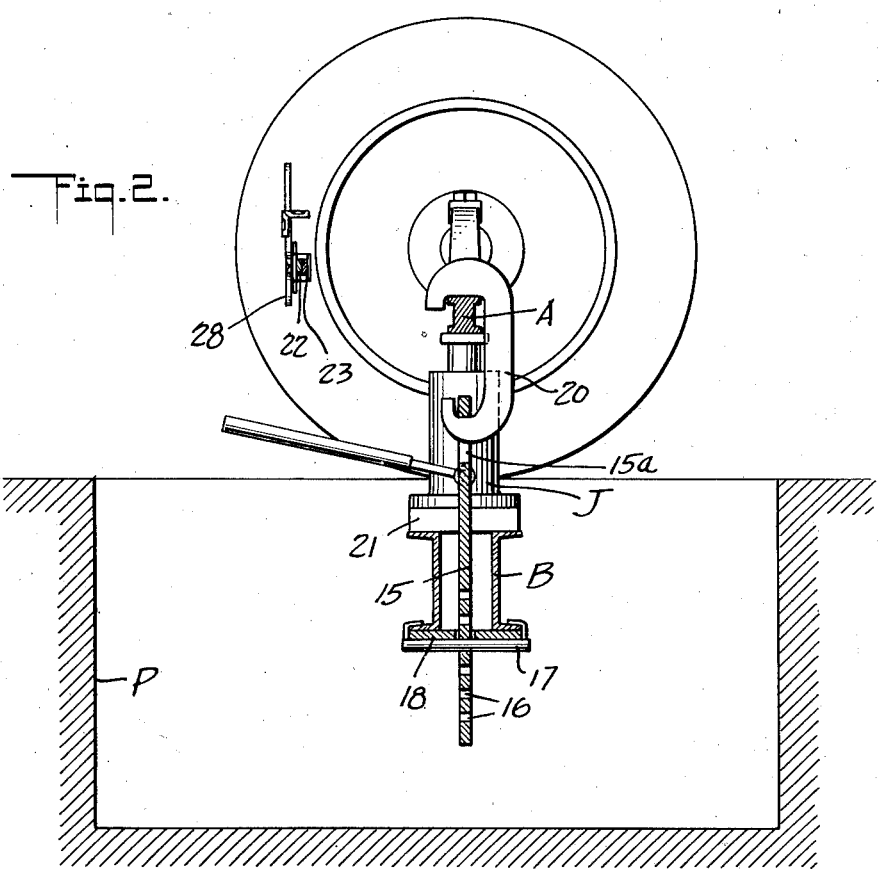
Figure 2 is a vertical sectional view taken on the line 2—2 of Figure 1.

Referring specifically to the drawings, my invention in its present embodiment comprises a pit P formed in the floor of a garage with the end walls thereof formed of concrete or other suitable material in which is embedded the ends of a pair of channel bars B. The bars B are secured in spaced parallel relation as shown in Figure 2, so as to accommodate therebetween one or more uprights 15 each of which is in the form of a bar provided with a series of perforations 16 through any one of which is adapted to extend a pin 17 in such manner that it engages the under side of a plate 18 disposed in spanning relation to the lower edges of the bars and carrying clips 19 adapted to engage the lower flanges of the bars, all as clearly illustrated in Figures 2, 3 and 4. The upright 15 extends through a suitable opening in the plate 18 and through the medium of the pin 17 the upright can be locked in any vertical adjusted position The upper end of the upright 15 is provided with an opening 15ª, in which is engaged the lower hooked end of a connector 20. The upper end of the connector is likewise of hooked form for engagement with an axle A of a motor vehicle. Thus the connector 20 and the upright 15 co-operate in holding the vehicle axle against upward movement at any point along the length of the axle, depending upon the point at which the connector is applied, and by virtue of the adjustment of the upright it will be manifest that the connector can be applied to vehicle axles irrespective of their elevation with respect to the top of the pit in order to render the apparatus adaptable to motor vehicles having axles at different elevations due to the construction of the axle or the diameter of the front wheels.

The bars B are adapted to support one or more jacks J, and these jacks may be of any conventional form, preferably a hydraulic jack, in order that the necessary upward force may be obtained to secure the bending of an axle. As shown in Figure 2, the jack J is associated with the bars B so as to span the latter, a block 21 being interposed between the base of the jack and the bars.

My apparatus also includes a gage by which the camber of the front wheels of a vehicle can be readily determined, and any change in camber incident to the bending of the axle whereby the desired camber of the wheels can be secured. This gage in the present instance comprises a pair of bars 22 and 23 telescopically associated with each other through the medium of a pair of brackets 24 and 25 secured respectively to the bars 22 and 23 and provided with openings 26 (Figure 9) through which the bars extend. A spring 27 is interposed between the brackets so as to normally urge the bars outwardly, it being understood that the spring is yieldable to permit the bars to be moved inwardly in effecting an application of the gage to the front wheels of a vehicle. At the outer ends of the bars arms 28 are pivoted thereon at the point indicated at 29, and these arms having laterally projecting ends 30 which are adapted to have contact with the rims of the front wheels when the gage is in applied position as illustrated in Figure 1. The arms 28 at points horizontally alined with respect to the pivots 29 are formed with pointed extensions 31 which constitute indicating hands and which are movable over dials 32 mounted on the bars 22 and 23 by means of screws 33 having knurled heads. As shown in Figure 7, the screw 33 for either dial 32 extends axially through the dial and is adjustable to permit rotation of the dial on the screw in order that the dial may occupy various positions. In the present instance the dial is adapted to occupy any one of four positions, each of which is determined by means of openings 34 in the dial and through any one of which a locking pin 35 is adapted to extend to secure the dial in fixed position. Four sets of graduations indicated at 36 are on the face of the dial and each set of graduations is designed for use in connection with the front wheels of a motor vehicle of a predetermined diameter. For example, that set of graduations bearing the numeral 30 is adapted for use in connection with wheels thirty inches in diameter, and with the dial adjusted to the position shown in Figure 7 it will be clear that the pointed end of the indicating hand 31 is adapted to move over the graduations and in this manner to indicate the precise camber of a thirty inch wheel to which the arm 28 is applied. Each arm 28 carries a pair of spirit levels 37 and 38, the level 37 being designed for determining the true vertical position of the arm 28 as applied to the inner side of a front wheel, it being understood that in the use of the gage it is necessary that both arms 28 in applied position to the wheels occupy true vertical positions. The gage is also capable of determining the toe-in of the front wheels, and in this adaptation the arms 28 assume horizontal positions when applied to the front wheels, the arms 28 being employed to ascertain the relative positions of the wheels in respect to toe-in.

It will be understood that the sets of graduations on the dials are employed to indicate the over all diameter of a wheel, that is, the diameter of the wheel with the tire included.

The operation of the apparatus is as follows:

By moving a motor vehicle to such position that its front end overlies the pit P, its front axle A can be positioned to overlie the bars B in the manner illustrated in Figure 2 in order to permit the subsequent application of one or more connectors 20 thereto for holding the axle at the desired points along its length. Before applying the connectors it is necessary to determine the camber of the front wheels indicated at W and W'. This is accomplished by applying the gage in the manner illustrated in Figure 1. As shown by the right hand indicating hand 31 with respect to the corresponding dial 32 the camber of the wheel W is, let it be assumed, correct for highways of a given crown. As shown by the other indicating hand 31 the camber of the wheel W' is insufficient and hence it is necessary to bend the left hand end portion of the axle downwardly to increase the camber of the wheel W'. This is accomplished by applying two connectors 20 and their uprights 15 to the axle A, one of the connectors engaging the axle at a point intermediate the ends of the latter, while the other engages the axle adjacent the left hand end thereof. A jack J is now positioned on the bars B between the connectors 20 and by actuating the jack a lifting force is exerted which is resisted by the connectors 20 in such manner that the left hand end portion of the axle A is bent downwardly. The corresponding indicating hand and dial accurately indicates the degree of bending and by properly controlling the operation of the jack it will be manifest that the desired degree of bending can be accomplished. In actual practice the axle is bent until the camber of the wheel W' is the same as the camber of the wheel W, it being understood, however, that in increasing the camber of the wheel W' a slight increase in the camber of the wheel W is simultaneously effected so that the correct camber of the wheel W is temporarily lost. However, it is ultimately restored when the axle is bent through the application of the apparatus in the manner illustrated in Figure 10. As here shown I employ two jacks J and two connectors 20, the jacks being positioned adjacent the ends of the axle and the connectors at opposite sides of the medial point of the axle. With the apparatus thus applied it will be clear that the jacks can be operated to exert lifting forces on the opposite ends of the axle, thereby bending such ends upwardly the desired degree or until both of the wheels assume the original position indicated by the hand 31 of the wheel W whereby the camber of both wheels is made the same and the correct or desired camber.

To illustrate another application of the apparatus, reference is had to Figure 11, wherein the condition is reversed in respect to that illustrated in Figure 1, that is, the camber of the wheel W' is correct, while that of the wheel W is excessive, and it is therefore necessary to bend the left hand end of the axle upwardly. To this end two jacks and a single connector 20 are applied in the manner shown, and with actuation of the jacks the axle end can be bent upwardly until the two hands 31 indicate the same degree of camber for both wheels. During this bending the correct camber of the wheel W is naturally lost as the result of a slight upward bending at the right hand end of the axle, but by applying the apparatus as illustrated in Figure 12 both ends of the axle can be bent downwardly the same degree whereby the correct camber of both of the wheels is simultaneously effected.

From the foregoing operation it will be manifest that the connectors 20 and their uprights 15 are capable of adjustment longitudinally on the bars B, the latter constituting a base and the uprights and connectors constituting the holding means which are capable of engaging and holding an axle at any desired points along its length in order that they may properly co-operate with one or more jacks in effecting the desired bending of the axle to secure the proper camber of the front wheels of the vehicle.

Furthermore by providing a base or support which in effect is a rigid member and is fixed in a position so that an automobile can be rolled on its wheels to dispose an axle to be bent, above and substantially parallel to the length of the member, lateral and longitudinal shifting or displacement of the member with respect to the axle during the bending operation, is prevented, and the connectors and their uprights enabled to co-act with the jacks, in effecting a predetermined bending of the axle with maximum efficiency and accuracy.

Although I have herein shown and described only one form of axle bending apparatus embodying my invention, it is to be understood that various changes and modifications may be made without departing from the spirit of the invention, and the spirit and scope of the appended claims.

I claim:

1. An axle bending apparatus comprising a pair of bars adapted to be supported in side by side spaced relation from the walls of a pit, a plate slidably mounted on the bars, an upright member between the bars extending through said plate and having an opening therethrough, a pin extending through said opening and engaging the underside of the plate, a connector by which said member is adapted to be connected to the axle of a vehicle in a manner to prevent upward movement of the axle at the point of connection, and means adapted to be supported on said bars by which a force is adapted to be exerted against the axle at opposite sides of said connector, whereby the latter will coact with said means to effect the bending of the axle.

2. An axle bending apparatus comprising a pair of bars adapted to be supported in side by side spaced relation from the walls of a pit, a plate, clips secured to the plate and engaging the bars so as to support the plate for sliding movement along the underside of the bars, said plate having an opening therethrough, an upright member between said bars, extending through the plate opening and having a series of openings, a pin adapted to be extended through any one of said openings in said member and engaging the underside of said plate, a connector having hooked ends by which said member is adapted to be connected to the axle of a vehicle so as to hold the axle against upward movement at the point of connection, and means adapted to be supported on said bars by which an upward force is adapted to be exerted against the axle at opposite sides of said connector, whereby the latter will coact with said means to effect bending of the axle.

3. Means for supporting an axle against upward movement comprising a pair of bars adapted to be supported in side-by-side spaced relation from the walls of a pit, a plate slidably mounted on the bars, an upright member between the bars extending through said plate and having an opening therethrough, a pin extending through said opening and engaging the under side of the plate, and a connector having means by which it is capable of being connected to said member and the axle in a manner to prevent upward movement of the axle at its point of connection with the connector.

WALTER BAGGE.